United States Patent
Kobayashi

(10) Patent No.: US 11,958,429 B2
(45) Date of Patent: Apr. 16, 2024

(54) SIDE AIRBAG DEVICE

(71) Applicant: Autoliv Development AB, Vargarda (SE)

(72) Inventor: Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/995,661

(22) PCT Filed: Apr. 5, 2021

(86) PCT No.: PCT/JP2021/014490
§ 371 (c)(1),
(2) Date: Oct. 6, 2022

(87) PCT Pub. No.: WO2021/206051
PCT Pub. Date: Oct. 14, 2021

(65) Prior Publication Data
US 2023/0202421 A1    Jun. 29, 2023

(30) Foreign Application Priority Data
Apr. 9, 2020   (JP) .................................. 2020-070550

(51) Int. Cl.
*B60R 21/231*   (2011.01)
*B60R 21/207*   (2006.01)
(Continued)

(52) U.S. Cl.
CPC ...... *B60R 21/23138* (2013.01); *B60R 21/207* (2013.01); *B60R 21/233* (2013.01); *B60R 21/237* (2013.01); *B60R 2021/23146* (2013.01)

(58) Field of Classification Search
CPC ............ B60R 21/207; B60R 21/23138; B60R 21/233; B60R 21/237; B60R 2021/23146; B60R 2021/23308
See application file for complete search history.

(56) References Cited

U.S. PATENT DOCUMENTS 7,669,888 B2 *  3/2010  Sato ...................... B60R 21/207
                                          280/730.2
7,681,907 B2 *  3/2010  Svenbrant ............. B60R 21/233
                                          280/730.2
(Continued)

FOREIGN PATENT DOCUMENTS

CN       104369711 A       2/2015
JP       10338097 A   *  12/1998
(Continued)

OTHER PUBLICATIONS

Japanese Office Action regarding Patent Application No. 2022514062, dated May 18, 2023.
(Continued)

*Primary Examiner* — Laura Freedman
(74) *Attorney, Agent, or Firm* — Harness, Dickey & Pierce, P.L.C.; Stephen T. Olson

(57) ABSTRACT

A side airbag device is provided with a frame side plate part, an airbag cushion embedded in a side support of a seat in a stowed state, and an inflator inserted into the airbag cushion. The airbag cushion in stowed state includes a cushion rear part assembled to a frame side plate part, a cushion extension part that extends along a seat pad of the side support, a cushion folding part folded rearward from the cushion extension part, and a cushion front part of the cushion folding part arranged rolled or folded toward the outside of the seatback. The cushion extension part expands toward the center of the seatback and presses on the occupant.

15 Claims, 14 Drawing Sheets

(51) Int. Cl.
*B60R 21/233* (2006.01)
*B60R 21/237* (2006.01)

(56) References Cited

U.S. PATENT DOCUMENTS

| | | | | |
|---|---|---|---|---|
| 8,033,570 | B2 * | 10/2011 | Sato | B60R 21/23138 |
| | | | | 280/730.2 |
| 8,152,197 | B2 * | 4/2012 | Taguchi | B60R 21/207 |
| | | | | 280/730.2 |
| 8,814,204 | B2 * | 8/2014 | Fukawatase | B60R 21/207 |
| | | | | 280/730.2 |
| 8,939,464 | B2 * | 1/2015 | Acker | B60R 21/207 |
| | | | | 280/730.2 |
| 9,056,591 | B2 * | 6/2015 | Fujiwara | B60R 21/233 |
| 9,067,558 | B2 * | 6/2015 | Akiyama | B60R 21/207 |
| 9,120,457 | B2 * | 9/2015 | Kino | B60R 21/233 |
| 9,751,487 | B2 * | 9/2017 | Sendelbach | B60R 21/23138 |
| 9,862,345 | B2 * | 1/2018 | Ohno | B60R 21/2338 |
| 9,932,011 | B2 * | 4/2018 | Hiraiwa | B60R 21/23138 |
| 9,969,351 | B2 * | 5/2018 | Ohno | B60R 21/23138 |
| 10,017,148 | B2 * | 7/2018 | Hayashi | B60R 21/237 |
| 10,035,485 | B2 * | 7/2018 | Fujiwara | B60R 21/207 |
| 10,272,866 | B2 * | 4/2019 | Hiraiwa | B60N 2/42745 |
| 10,343,638 | B2 * | 7/2019 | Fukawatase | B60R 21/233 |
| 10,703,322 | B2 * | 7/2020 | Kitagawa | B60R 21/23138 |
| 10,744,970 | B2 * | 8/2020 | Ohno | B60R 21/215 |
| 10,875,487 | B2 * | 12/2020 | Kobayashi | B60R 21/207 |
| 11,104,287 | B2 * | 8/2021 | Kobayashi | B60R 21/207 |
| 11,214,215 | B2 * | 1/2022 | Kobayashi | B60R 21/26 |
| 11,214,223 | B2 * | 1/2022 | Kobayashi | B60R 21/23138 |
| 11,235,724 | B2 * | 2/2022 | Kobayashi | B60R 21/23138 |
| 11,351,948 | B2 * | 6/2022 | Kobayashi | B60N 2/70 |
| 11,505,156 | B2 * | 11/2022 | Kabeya | B60R 21/235 |
| 11,752,965 | B2 * | 9/2023 | Kobayashi | B60R 21/237 |
| | | | | 280/728.1 |
| 11,752,967 | B2 * | 9/2023 | Kobayashi | B60N 2/682 |
| | | | | 280/730.2 |
| 11,766,983 | B2 * | 9/2023 | Kobayashi | B60R 21/23138 |
| | | | | 280/728.2 |
| 2015/0115583 | A1 * | 4/2015 | Azuma | B60R 21/233 |
| | | | | 280/740 |
| 2021/0086719 | A1 * | 3/2021 | Ota | B60R 21/2338 |
| 2022/0055570 | A1 * | 2/2022 | Kobayashi | B60R 21/237 |
| 2023/0182673 | A1 * | 6/2023 | Kobayashi | B60R 21/2342 |
| | | | | 280/730.2 |

FOREIGN PATENT DOCUMENTS

| | | | | |
|---|---|---|---|---|
| JP | 2010143356 A | | 7/2010 | |
| JP | 2011-116155 A | | 6/2011 | |
| JP | 2014237411 A | * | 12/2014 | ....... B60R 21/23138 |
| JP | 2015-36279 A | | 2/2015 | |
| JP | 2015-143086 A | | 8/2015 | |
| JP | 2015205584 A | * | 11/2015 | |
| JP | 2017095057 A | * | 6/2017 | |
| JP | 2019-131165 A | | 8/2019 | |
| JP | 2019137100 A | | 8/2019 | |
| WO | WO-2018105335 A1 | * | 6/2018 | ........... B60R 21/207 |
| WO | 2019/193984 A1 | | 10/2019 | |

OTHER PUBLICATIONS

Office Action received in corresponding Chinese Patent Application 202180028210.X, dated Apr. 14, 2023 with translation.

* cited by examiner

A-A

A-A

A-A

SIDE AIRBAG DEVICE

TECHNICAL FIELD

The present invention relates to a side airbag device mounted on a vehicle.

BACKGROUND TECHNOLOGY

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure.

There are various types of airbag devices depending on the installation site and application. For example, a front airbag device is provided in a center of a steering wheel in order to protect a driver from a collision in a front-back direction. In addition, a curtain airbag device is provided in the vicinity of a ceiling above a side window, and a side airbag device is provided on a side part of a seat to protect an occupant from an impact in a vehicle width direction due to a side collision or the like.

An airbag cushion of a typical airbag device is stored in various sites of a vehicle in a wound or folded storing form. For example, Patent Document 1 discloses technology for stowing a curtain airbag device. In the technology of Patent Document 1, an airbag 1 is folded at each vent hole portion and then rolled into a roll shape before mounting on a vehicle. According to Patent Document 1, by folding the airbag 1 at each vent hole portion, gas is concentrated and accumulated in main expansion parts 41, 42, and the like, and the main expansion parts 41, 42, and the like can be quickly caused to expand and deploy toward the occupant.

PRIOR ART DOCUMENTS

Patent Documents

Patent Document 1: Japanese Unexamined Patent Application No. 2011-116155

SUMMARY OF THE INVENTION

Problem to be Solved by the Invention

Currently, there is demand for further improvement in occupant restraining performance of airbag cushions of side airbag devices. To achieve this, efficient stowing in limited space inside a seat and innovations to enable smooth expansion and deployment are required.

In light of these problems, an object of the present invention is to provide a side airbag device that improves occupant restraining performance and that can be efficiently stowed inside a seat.

Means for Solving the Problems

To resolve the problems described above, a typical configuration of a side airbag device according to the present invention includes:

a side support formed at an end part in a width direction of a seatback of a vehicle seat having a surface skin and seat pad bent and protruding forward as compared to an area at a center of the seatback in the width direction;

a frame side plate portion along the seatback side surface inside the side support of a seat inner frame;

an airbag cushion that is a bag rolled or folded into a prescribed stowed state and embedded in the side support; and an inflator inserted into the airbag cushion assembled in the frame side plate part together with the airbag cushion; wherein the airbag cushion in a stowed state includes:

a cushion rear part assembled to the frame side plate part with the inflator contained therein;

a cushion extension part extending from the cushion rear part toward the front along the center side seat pad of the side support of the seat back in the width direction;

a cushion folding part folded from the cushion extension part towards the rear; and a cushion front part rolled or folded from the cushion folding part toward the outside of the cushion folding part in the width direction of the seatback; and the cushion extension part receives gas from the cushion rear part, expands toward the center of the seatback, and together with the seat pad, pushes on the occupant.

With the configuration described above, in the first part of the expansion and deployment process of the airbag cushion, the cushion extension part of the airbag cushion presses on the seat pad and surface skin of the side support, enabling efficient cleaving and the like of the surface skin of the side support. In addition, the cushion extension part expanding toward the center of the seatback while pushing on the seat pad enables pushing the occupant back toward the center of the seatback, in other words, close to the regular seating position. Thus, with the configuration described above, smooth expansion and deployment of the airbag cushion from inside the side support toward the side of the occupant in a sitting position is achieved, enabling improved occupant restraint performance of the airbag cushion.

The inflator described above is assembled together with the airbag cushion to the frame side plate part at the center side of the seatback and the cushion rear part may be assembled to the center side of the frame side plate part.

With the configuration described above, expansion and deployment of the airbag cushion from inside the side support toward the side of the occupant in a sitting position is smoothly achieved, enabling achieving a side airbag device that enables improved occupant restraint performance of the airbag cushion.

The airbag cushion described above may include a main chamber formed such that primarily the cushion front part expands and deploys in a prescribed shape and a pre-push chamber formed such that primarily the cushion extension part expands and deploys at the center side of the main chamber.

With the configuration described above, implementing the cushion extension part by means of the pre-push chamber enables efficient cleaving of the side support surface skin and pushing back the occupant.

The cushion folding part described above may be formed from near the front end of the side support to near the frame side plate part. With a cushion folding part with this manner of configuration, when filled with gas and unfolded, the motion toward the center side of the seatback in the width direction can be efficiently produced.

The airbag cushion in stowed form described above may further include a cushion center part formed between the cushion folding part and the cushion front part arranged rolled or folded at the center side of the frame side plate part.

This configuration also enables efficient stowing of the airbag cushion in a stowed state inside the side support.

The cushion front part described above may be in a state rolled clockwise as viewed from above. This configuration enables efficient stowing of the cushion front part inside the side support.

The cushion front part described above may be in a state rolled counterclockwise as viewed from above. This configuration enables efficient stowing of the cushion front part inside the side support.

The cushion front part described above may be folded in a bellows shape as viewed from above. This configuration enables efficient stowing of the cushion front part inside the side support.

The side airbag device may further include a prescribed bracket assembled to the frame side plate part, where the bracket may include a base part arranged between the frame side plate part and the cushion rear part of the airbag cushion in a stowed state, and a rear wall part that extends and bends outwardly in the width direction of the seatback from a part of the base part more forward than the frame side plate part.

With this configuration, the cushion front part of the airbag cushion can use the rear wall part of the bracket as support when expanding and deploying forward, and this enables smooth expansion and deployment of the airbag cushion and improved occupant protection performance of the airbag cushion.

The rear wall part described above may protrude outside the frame side plate part in the width direction of the seatback and the cushion front part of the airbag cushion in a stowed state may be arranged in front of the rear wall part of the bracket. With this configuration, the rear wall part of the bracket serves as a support when the cushion front part expands and deploys forward and this enables smooth expansion and deployment of the airbag cushion and thus improvement in occupant protection performance of the airbag cushion.

The cushion front part described above may have a part arranged on the frame side plate part to the outside of the seatback in the width direction. This configuration also enables efficient stowing of the airbag cushion in a stowed state inside the side support.

The inflator described above may be assembled together with the airbag cushion to the frame side plate part, outside in the width direction of the seatback, and the cushion rear part may be assembled to the frame side plate part, outside in the width direction of the seatback.

With the configuration described above, expansion and deployment of the airbag cushion from inside the side support toward the side of the occupant in a sitting position is smoothly achieved, enabling achieving a side airbag device that enables improved occupant restraint performance of the airbag cushion.

The cushion extension part described above may extend forward from the cushion rear part while in contact with the frame side plate part, bend along the front edge of the frame side plate part toward the seat pad of the side support in the center side of the seatback in the width direction, and may extend forward while in contact with the seat pad.

With the configuration described above as well, in the first part of the expansion and deployment process, the cushion extension part of the airbag cushion presses on the seat pad and surface skin of the side support, enabling efficient cleaving of the surface skin of the side support. In addition, the cushion extension part expanding toward the center of the seatback while pushing on the seat pad enables pushing the occupant back toward the center of the seatback, in other words, close to the regular seating position.

The airbag cushion described above may include a main chamber formed such that primarily the cushion front part expands and deploys in a prescribed shape and a pre-push chamber formed such that primarily the cushion extension part expands and deploys at the center side of the main chamber.

With the configuration described above as well, implementing the cushion extension part by means of the pre-push chamber enables efficient cleaving of the side support surface skin and pushing back the occupant.

Effect of the Invention

The present invention enables providing a side airbag device that improves occupant restraining performance and can be efficiently stowed inside a seat.

MODE FOR CARRYING OUT THE INVENTION

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions, and configurations are labeled with identical symbols in order to omit redundant descriptions along with an illustration of elements not directly related to the present invention.

Figure 1A:
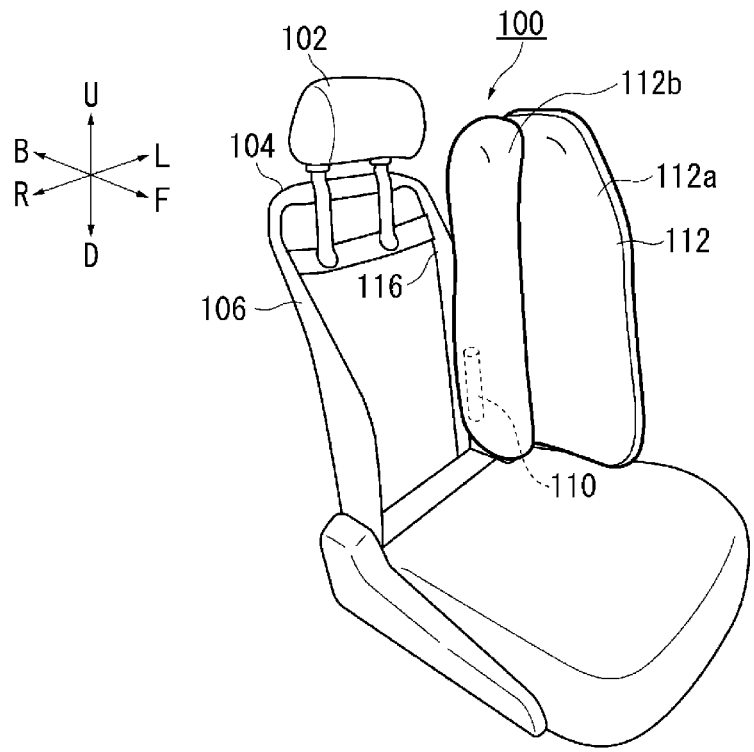
FIG. 1 is a diagram illustrating a side airbag device according to an embodiment of the present invention.

FIG. 1 is a diagram illustrating a side airbag device 100 according to an embodiment of the present invention. FIG. 1(a) illustrates an airbag cushion 112 in an activated state. The airbag apparatus 100 is equipped in a seat 102 for a vehicle as a side airbag of the vehicle. FIG. 1(a) illustrates the airbag device 100, a seat 102, and the right side of the seat 102 in the width direction. Furthermore, the front-back direction with respect to the seat 102 is appropriately indicated by arrows F (Forward) and B (Back), respectively, the left-right is indicated by arrows L (Left) and R (Right), respectively, and the up-down direction is indicated by arrows U (Up) and D (Down), respectively.

The seat 102 normally faces the front of the vehicle, but may also be rotated to face the rear. Therefore, the directions indicated by arrows in each diagram are not intended to be limited to the front-back and left-right directions relative to the vehicle, but rather the front direction is "front" and a back side direction is "back" as viewed from an occupant in a regular orientation in the seat 102. Similarly, a right hand direction of the occupant at this time is "right" and a left hand direction is "left". Furthermore, with regard to the center of the body of the occupant at this time, a direction toward the head is "up" and a direction toward the leg is "down." In addition, directions termed inward and outward in the description below are as viewed by an occupant sitting in a regular orientation as described above where in a relative positional relationship of a plurality of objects, those close to the occupant are termed inward and those far away from the occupant are termed outward.

In FIG. 1(a), the skin or seat pad (for example, urethane material) of the seatback 104 of the seat 102 is omitted, and only a frame 106 is illustrated. The frame 106 is a skeletal structure member equipped in the seatback 104. Note, the seat 102 is assumed to be arranged on the left side in the front row. However, the airbag device 100 can be provided in any seat, in the front row, in the back row, and can even be provided on either the left or right side of the vehicle.

The airbag device 100 uses the airbag cushion 112 to restrain an occupant seated on the seat 102 from the side in an emergency such as when an impact occurs on the vehicle. The airbag cushion 112 is a bag-shaped member for capturing an occupant and is formed by overlapping, stitching, and otherwise adhering a plurality of base materials included on the surface thereof or weaving using OPW (one piece woven). The airbag cushion 112 of the present Embodiment is configured including a main chamber 112a that expands and deploys in a relatively broad shape and a pre-push chamber 112b that is on the back side of the main chamber 112a and expands and deploys protruding toward the center of the seatback 104 in the width direction.

An inflator 110 is a gas generating device that operates upon receiving an activation signal transmitted from the vehicle side when an impact occurs, and supplies gas to the inside of the airbag cushion 112. In the present embodiment, the inflator 110 used is a cylinder type. The inflator 110 is equipped on the rear side of the inside of the airbag cushion 112 with the longitudinal direction thereof facing up and down. A plurality of stud bolts 118 protrude from a main body of the inflator 110 (see FIG. 2(a) and the like), and the stud bolts 118 are secured by fastening the stud bolts 118 to a frame side plate part 116.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types can be used for the inflator 110.

Figure 1B:
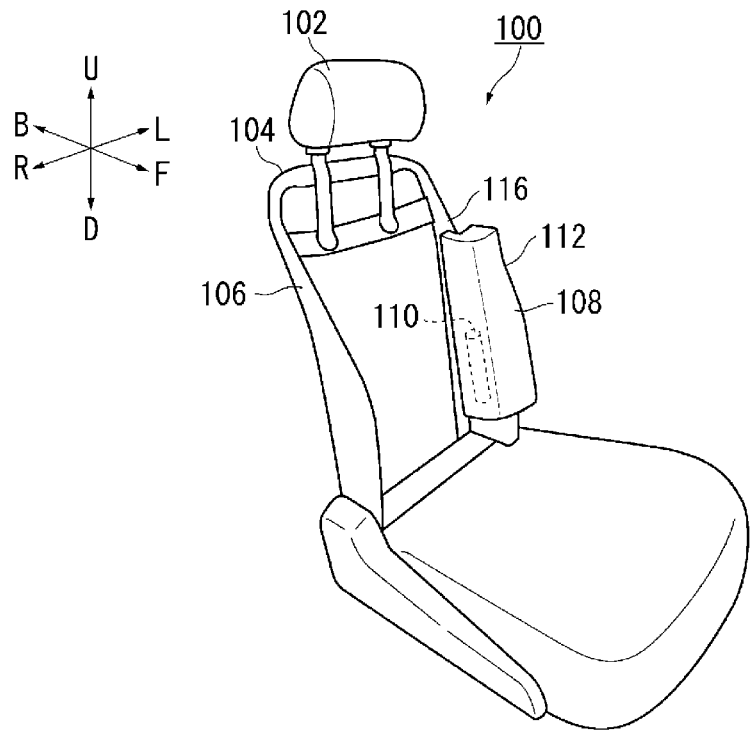

FIG. 1(b) is a diagram illustrating the state before activation of the airbag cushion 112 in FIG. 1(a). Prior to activation, the airbag cushion 112 (see FIG. 2 (b)) is placed in a stowed state with the inflator 110 inserted and then rolled or folded or the like and then by integrating with a bracket 120, is unitized as an airbag module 108.

The airbag module 108 is assembled to the frame side plate part 116 of the frame 106. The frame side plate part 116 is located in the frame 106 along left and right side surfaces of the seatback 104. A pair of frame side plate parts 116 are provided on the left and right sides in the vehicle width direction of the seatback 104. In the present embodiment, the airbag module 108 is assembled to the frame side plate part 116 on the left side of the seatback 104 in the width direction. Note that the airbag module 108 can also be assembled to the frame side plate part on the right side of the seatback 104 in the width direction. In other words, the airbag module 108 can be installed either on a side part on a door side (near side) of the seat 102 that is closer to a collision point, or on a side part on a vehicle inner side (far side) that is farther from the collision point.

Figure 2A:
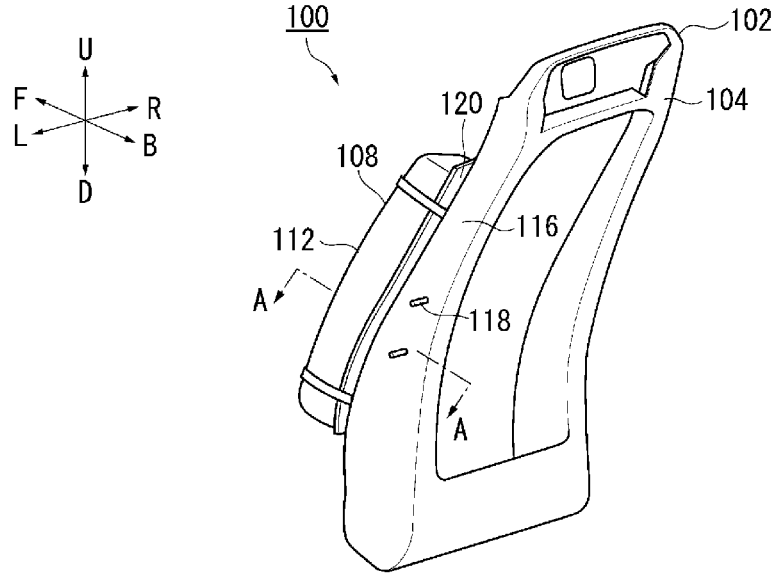
FIG. 2 is a perspective view of the side airbag device in FIG. 1(b) from the rear.

FIG. 2 is a perspective view of the side airbag device 100 in FIG. 1(b) from the rear. FIG. 2(a) illustrates the side airbag device 100 of FIG. 1(b) from the upper left rear side of the seat 102. The airbag cushion 112 in the stowed form has a vertically long shape along the frame side plate part 116.

Figure 3:
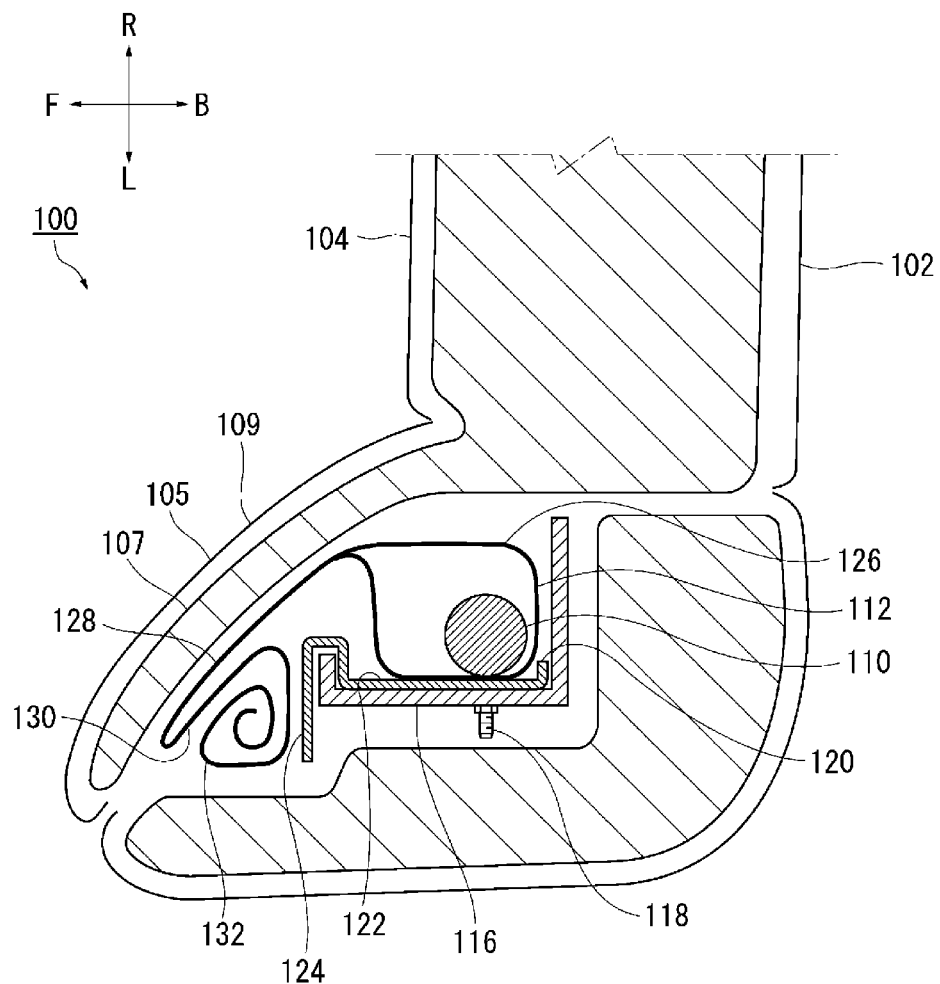
FIG. 3 is a cross-sectional view along A-A of the airbag module in FIG. 2(a).

The airbag module 108 is assembled to the frame side plate part 116 using the stud bolt 118 of the inflator 110 (see FIG. 3). The inflator 110 is inserted into a cushion rear part 126 described below and with respect to the frame side plate part 116, the body is attached in the center side of the seatback 104 of the seat 102 in the width direction, in other words, on the occupant side. A plurality of stud bolt 118 protrude from the main body of the inflator 110, and the inflator 110 is secured by fastening the stud bolt 118 to the frame side plate part 116.

Figure 2B:
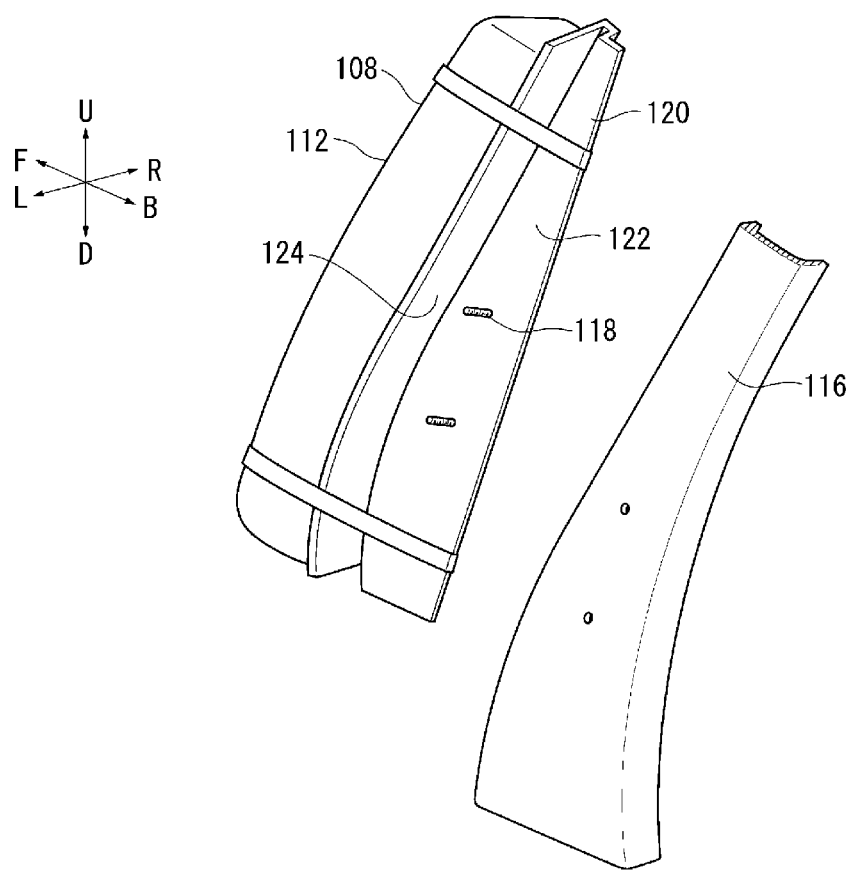

FIG. 2(b) is a diagram of the state of the airbag module 108 in FIG. 2(a) being removed from the frame side plate part 116. As described above, the bracket 120 is provided on the airbag module 108. The bracket 120 is a member made of resin having some level of rigidity that supports the airbag cushion 112 during expansion and deployment. The bracket 120 is formed longitudinally along the vertical direction of the frame side plate part 116, and provides support to the airbag cushion 112 from outside in the width direction of the seat 102.

The bracket 120 has a base part 122 to which the inflator 110 (see FIG. 9) and the airbag cushion 112 are secured and a rear wall part, which imparts a reaction force when the airbag cushion 112 expands. The base part 122 is formed in a plane along the frame side plate part 116 and the stud bolts 118 pass therethrough. A rear wall part 124 bends from the front side of the base part 122 and extends outward in the width direction of the seat back 104. The presence of the rear wall part 124 allows the airbag cushion 112 to push against the rear wall part 124 to expand and deploy efficiently toward the front of the vehicle. Note that the bracket 120 may be formed not only out of resin, but also may contain metal, and either of these materials allows for a configuration having suitable rigidity to be realized.

FIG. 3 is a cross-sectional view along A-A of the airbag module 108 in FIG. 2(a). As illustrated in FIG. 3, the frame side plate part 116 and airbag module 108 are integrated into a side support 109 of the seatback 104 of the seat 102. The side supports 109 are areas of the seatback 104 that project forward from both sides of the body of the occupant and are formed at both ends of the seatback 104 in the width direction. Compared to the center area in the width direction of the seatback 104, a surface skin 105 and seat pad 107 of the side supports 109 are curved and protrude forward.

Relative to the frame side plate parts 116, the bracket 120, airbag cushion 112, and main body portion of the inflator 110 are attached to the center side of the seatback 104 in the width direction. Furthermore, the stud bolt 118 penetrates from the main body portion 111 through the airbag cushion 112, the bracket 120, and the frame side plate part 116 and is fastened to the frame side plate part 116.

The airbag cushion 112 in a stowed state can be split into each location of a cushion rear part 126, a cushion extension part 128, a cushion folding part 130, and a cushion front part 132 according to the positional relationship when assembled to the frame side plate part 116.

The cushion rear part 126 is a portion towards the rear of the vehicle when the airbag cushion 112 is expanded and deployed (see FIG. 1(a)) that contains the inflator 110 and is positioned towards the center with regards to the frame side plate part 116 in the width direction of the seatback 104 when the airbag module 108 is assembled to the frame side plate part 116.

The cushion extension part 128 is a portion that pushes the occupant back toward the center of the seatback 104 at the initial expansion and deployment of the airbag cushion 112. The cushion extension part 128 extends from the cushion rear part 126 forward along the seat pad 107 of the side support 109 and to the outside in the width direction of the seatback 104.

The cushion folding part 130 is a portion folded toward the rear from the cushion extension part 128. The cushion folding part 130 is formed from near the surface skin 105 of the seat 102 to near the front side of the frame side plate part 116 toward the rear.

When the airbag cushion 112 expands and deploys (see FIG. 1(a)), the cushion front part 132 is the portion that serves primarily as the main chamber 112a. The cushion front part 132 is continuous from the cushion folding part 130 and as viewed from the cushion folding part 130 is arranged rolled or folded to the outside of the seatback 104 in the width direction. In particular, the cushion front part 132 is arranged in front of the rear wall part 124 of the bracket 120 and is able to obtain a reaction force from the rear wall part 124 during expansion and deployment.

In this embodiment, the cushion front part 132 is rolled clockwise when viewed from above. This configuration enables efficient stowing of the cushion front part 132 inside the seat 102.

The bracket 120 has the base part 122 that is arranged between the frame side plate part 116 and the cushion rear part 126 of the airbag cushion 112, and the rear wall part 124 that is extended and bent from the base part 122 at the front side of the frame side plate part 116 toward the outside direction in the width direction of the seatback 104. Herein, the rear wall part 124 is formed extending to an extent of protruding to the outside of the frame side plate part 116.

The portion of the bracket 120 between the base part 122 and the rear wall part 124 is in an engaged state with a rib shaped front edge of the frame side plate part 116. This configuration allows the bracket 120 to protect against positional displacement relative to the frame side plate part 116 and support the airbag cushion 112 without the orientation changing during expansion and deployment of the airbag cushion 112.

Figure 4A:
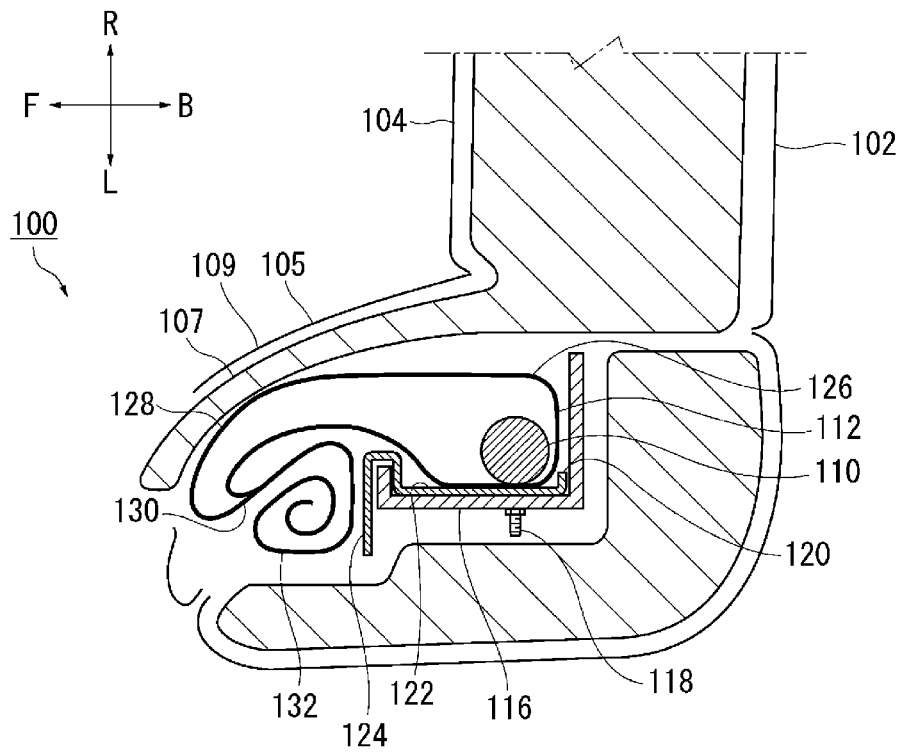
FIG. 4 is a diagram illustrating an example of the process of expansion and deployment of the airbag cushion in FIG. 3.

FIG. 4 is a diagram illustrating an example of the process of expansion and deployment of the airbag cushion 112 in FIG. 3. FIG. 4(a) illustrates an initial state of expansion and deployment of the airbag cushion 112 in FIG. 3.

With the airbag cushion 112 in a stowed state, if an impact to the vehicle occurs, a prescribed sensor detects the impact and sends an activation signal to the inflator 110. The inflator 110 activates and gas is supplied to the cushion rear part 126. Furthermore, gas supplied from the cushion rear part 126 expands the cushion extension part 128 and pushes and cleaves the surface skin 105 of the seatback 104 from the inside.

Figure 4B:
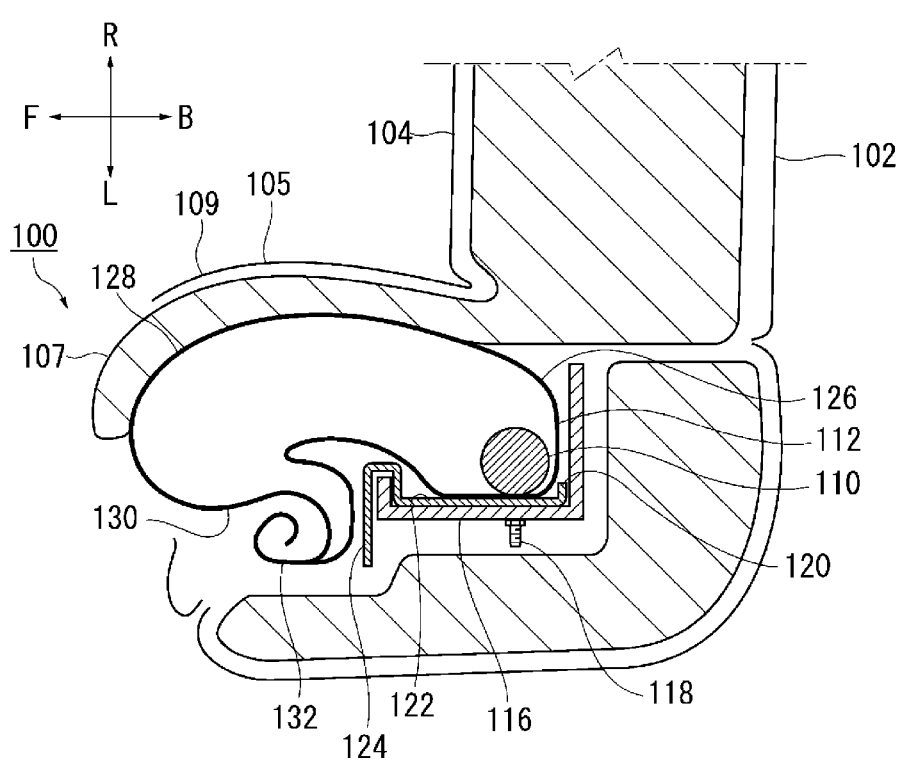

FIG. 4(b) is a state of the airbag cushion 112 continuing to expand and deploy from FIG. 4(a). After cleaving the surface skin 105 of the seatback 104, the cushion extension part 128 expands toward the center of the seatback 104. Herein, if the occupant is positioned leaning toward the airbag cushion 112 rather than a regular sitting position in the seat 102, the cushion extension part 128 pushes on the occupant together with the seat pad 107 and pushes the occupant back close to the center of the seatback 104, in other words, to the regular sitting position.

As the cushion extension part 128 expands, gas is also supplied to the cushion folding part 130. Herein, because of the cushion folding part 130, unfolding of the airbag cushion tends to be toward the center of the seatback 104. As illustrate in FIG. 3, the cushion folding part 130 is formed from near the front end of the side support 109 to near the frame side plate part 116. With a cushion folding part 130 with this manner of configuration, when filled with gas and unfolded, the motion of the airbag cushion 112 toward the center side of the seatback 104 in the width direction can be efficiently produced.

Upon expansion of the cushion folding part 130, gas is also supplied to the rolled cushion front part 132. While unrolling, the cushion front part 132 expands and deploys toward the front. Herein, the cushion front part 132 contacts the rear wall part 124 of the rear bracket 120 and obtains a reaction force toward the front from the rear wall part 124. Thus, the cushion front part 132 and therefore the entire airbag cushion 112 expands and deploys quickly and smoothly toward the front of the seat 102.

Figure 5:
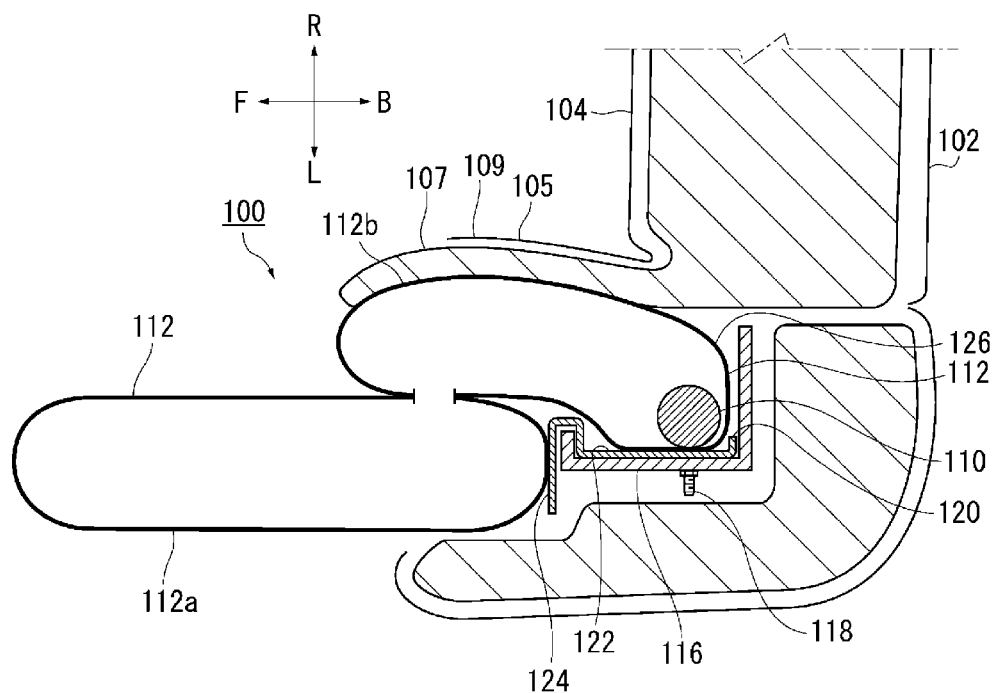
FIG. 5 is a state of the airbag cushion continuing to expand and deploy from FIG. 4(b).

FIG. 5 is a state of the airbag cushion 112 continuing to expand and deploy from FIG. 4(b). As described with reference to FIG. 1(a), the airbag cushion 112 of the present Embodiment is demarcated into two chambers, the main chamber 112a and the pre-push chamber 112b. In particular, the pre-push chamber 112b is primarily formed based on expansion and deployment by the cushion extension part 128. In addition, the main chamber 112a is formed by expansion and deployment of the cushion front part 132.

The main chamber 112a broadly expands and deploys from the rear wall part 124 of the bracket 120 towards the front. The pre-push chamber 112b expands and deploys from the back side of the main chamber 112a, protruding into the center side of the seatback 104.

Gas from the inflator 110 is supplied to the pre-push chamber 112b early on such that expansion and deployment is quickly completed earlier than that of the main chamber 112a. While pushing aside the seat pad 107 inside the seat 102 to ensure space, the pre-push chamber 112b quickly expands and deploys, returning the occupant toward the center of the seat 102. The pre-push chamber 112b pushing aside the seat pad 107 and the occupant enables the main chamber 112a to broadly expand and deploy into the secured space and thus is able to sufficiently restrain the occupant from the side.

As described above, the pre-push chamber 112b is shrunk to form the cushion extension part 128 of the airbag cushion 112 in the stowed form in FIG. 3. Implementing the cushion extension part 128 by means of the pre-push chamber 112b enables efficient cleaving of the surface skin 105 of the seat 102 and pushing the occupant back.

As described above, with the airbag cushion 112 of the present Embodiment, the side seat pad 107 and surface skin 105 of the side support 109 are pressed by the cushion extension part 128 during the initial expansion and deployment process enabling efficient cleaving of the surface skin 105. In addition, the cushion extension part 128 expanding toward the center of the seatback 104 while pushing on the seat pad 107 enables pushing the occupant back to the center of the seatback 104, in other words, close to the regular seating position. Thus, with the configuration of the present Embodiment, expansion and deployment of the airbag cushion 112 from inside the side support 109 toward the side of the occupant in a regular sitting position is smoothly achieved enabling improved occupant restraint performance of the airbag cushion 112.

In addition, the airbag cushion 112 can use the rear wall part 124 of the bracket 120 as support when expanding and deploying forward, enabling smooth expansion and deployment of the airbag cushion 112 and improved occupant restraint performance of the airbag cushion 112.

Note, with forming of the cushion extension part 128 inside the seat 102, the airbag cushion 112 having a pre-push chamber 112b is not essential. An airbag cushion configured without a pre-push chamber 112b provided, in other words, the configuration of the airbag cushion 112 in FIG. 5 not split into two chambers can also suitably form a cushion extension part 128 when stowed in the seat 102 and thus the occupant restraint performance can be improved.

Airbag Cushion of Modified Example 1

Figure 6:
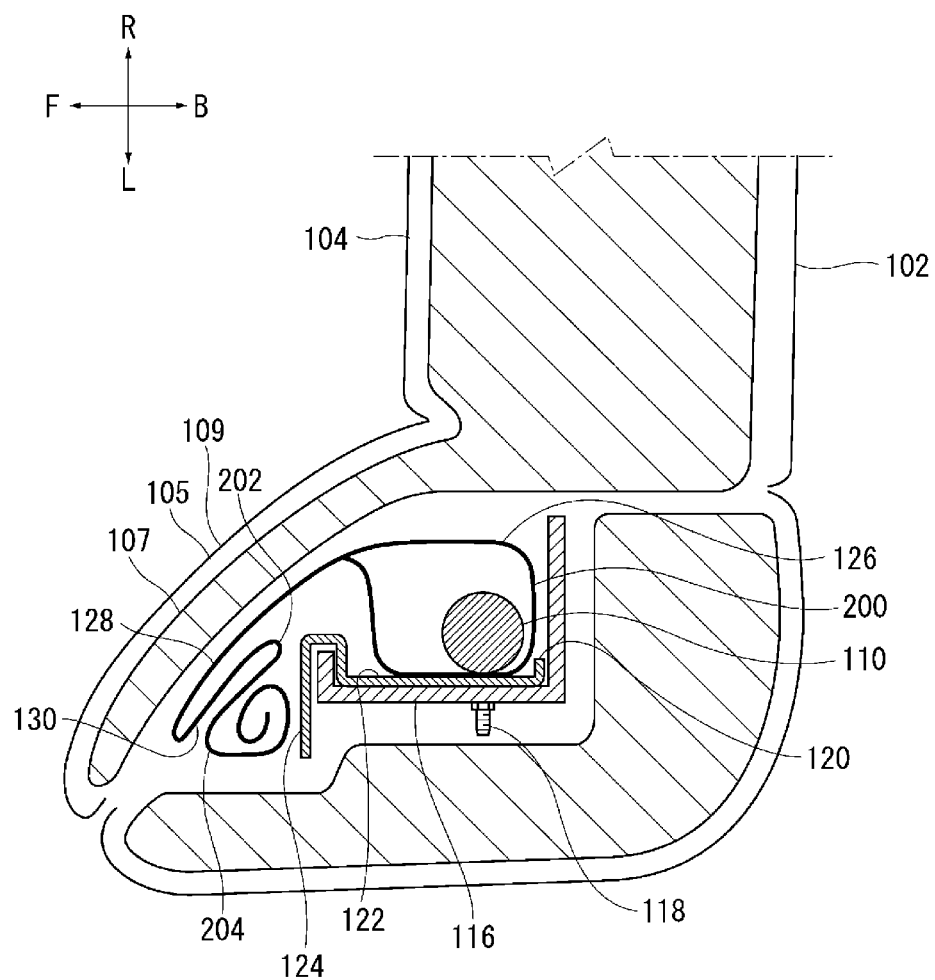
FIG. 6 is a diagram illustrating Modified Example 1 of the airbag cushion in FIG. 4.

FIG. 6 is a diagram illustrating Modified Example 1 of the airbag cushion in FIG. 4 (airbag cushion 200). In the description below, the same code will be provided for configuration elements that have already been described and the description thereof omitted. In addition, configuration elements with the same name as configuration elements already described have the same configuration and function even if a different reference is applied.

In the present Modified Example, a rear folding part 202 that is further folded forward is formed at the rear of the cushion folding part 130. Furthermore, a cushion front part 204 is rolled counterclockwise when viewed from above. This configuration enables efficient stowing of the cushion front part 204 inside the side support 109.

Figure 7A:
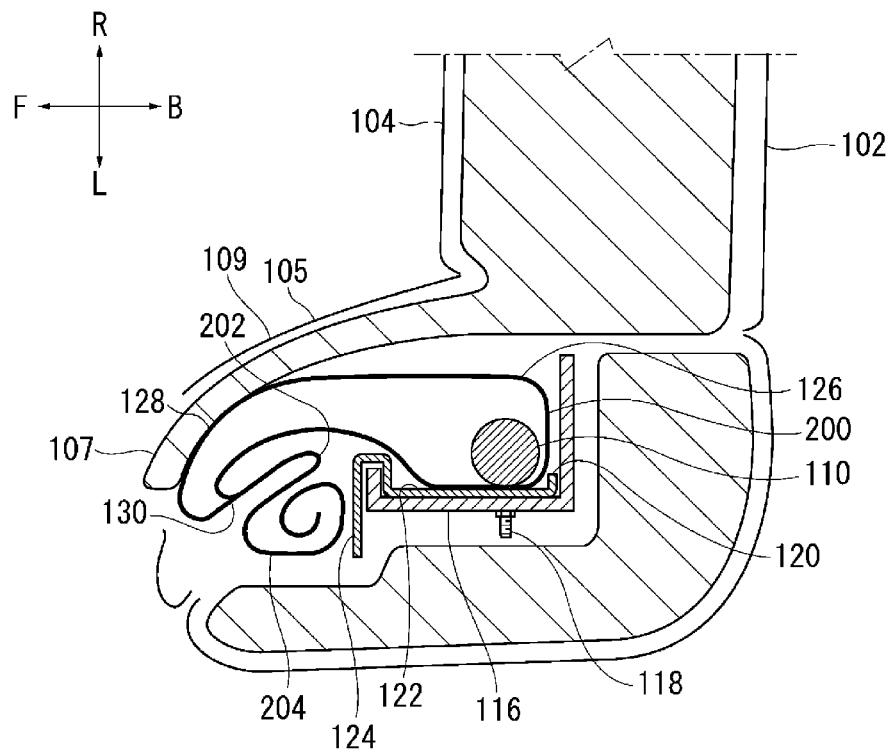
FIG. 7 is a diagram illustrating an example of the process of expansion and deployment of the airbag cushion in FIG. 6.

FIG. 7 is a diagram illustrating an example of the process of expansion and deployment of the airbag cushion 200 in FIG. 6. FIG. 7(a) illustrates an initial state of expansion and deployment of the airbag cushion 200 of FIG. 6. Also with the airbag cushion 200, after the inflator 110 activates and gas is supplied to the cushion rear part 126, the cushion extension part 128 expands and pushes and cleaves the surface skin 105 of the side support 109 from inside.

Figure 7B:
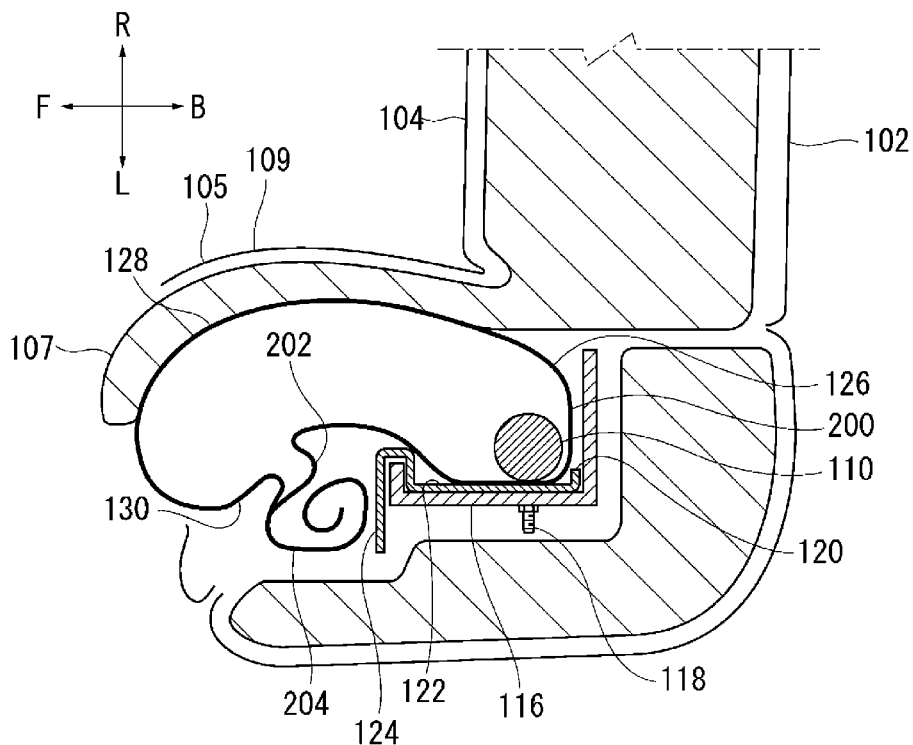

FIG. 7(b) is a state of the airbag cushion 200 continuing to expand and deploy from FIG. 7(a). After cleaving the surface skin 105 of the side support 109, the cushion extension part 128 expands toward the center of the seatback 104 and pushes the occupant back toward the center of the seatback 104.

As the cushion extension part 128 expands, gas is also supplied to the cushion folding part 130 and the rear folding part 202. Herein, because of the cushion folding part 130, unfolding of the airbag cushion 200 tends to be toward the center of the seatback 104. Furthermore, with the motion of the rear folding part 202 unfolding, the cushion front part 204 is pushed to the rear wall part 124 of the bracket 120. Thus, the cushion front part 204 is able to more efficiently obtain a reaction force from the rear wall part 124.

Upon expansion of the cushion folding part 130, gas is also supplied to the rolled cushion front part 204. While unrolling, the cushion front part 204 expands and deploys toward the front. Herein, the cushion front part 204 contacts the rear wall part 124 of the rear bracket 120 and obtains a reaction force toward the front from the rear wall part 124. Thus, similar to the airbag cushion 120 [sic] in FIG. 5 the cushion front part 204 and therefore the entire airbag cushion 200 quickly and smoothly expands and deploys toward the front of the seat 102.

Airbag Cushion of Modified Example 2

Figure 8:
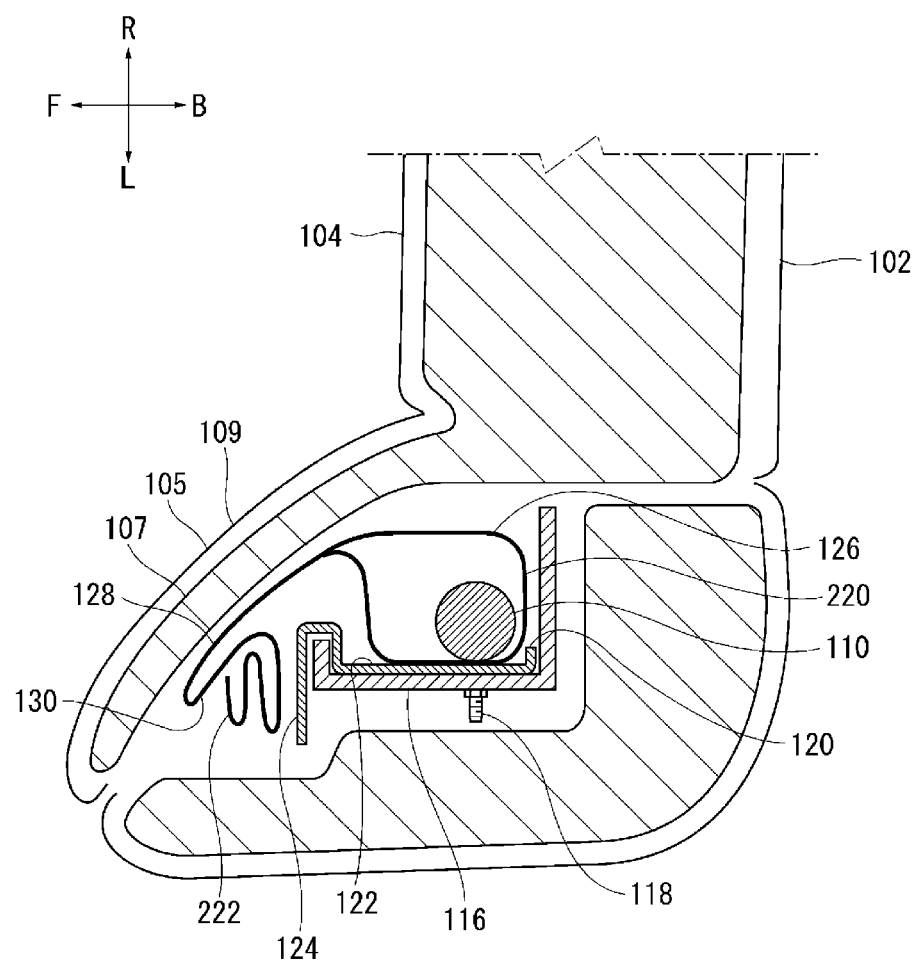
FIG. 8 is a diagram illustrating Modified Example 2 of the airbag cushion in FIG. 4.

FIG. 8 is a diagram illustrating Modified Example 2 of the airbag cushion 112 in FIG. 4 (an airbag cushion 220). In this Modified Example, as viewed from above, a cushion front part 222 may be folded in a bellows shape. This configuration enables efficient stowing of the cushion front part 222 inside the side support 109.

Figure 9A:
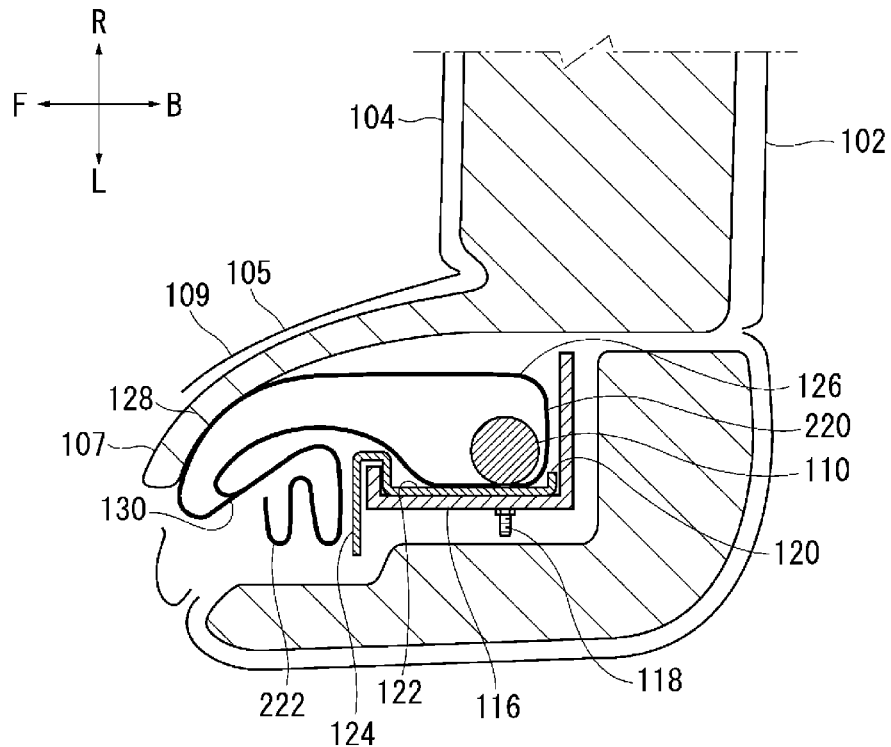
FIG. 9 is a diagram illustrating an example of the process of expansion and deployment of the airbag cushion of FIG. 8.

FIG. 9 is a diagram illustrating an example of the process of expansion and deployment of the airbag cushion 220 of FIG. 8. FIG. 9(a) illustrates an initial state of expansion and deployment of the airbag cushion 220 in FIG. 8. With the airbag cushion 220, after the inflator 110 activates and gas is supplied to the cushion rear part 126, the cushion extension part 128 expands and pushes and cleaves the surface skin 105 of the side support 109 from inside.

Figure 9B:
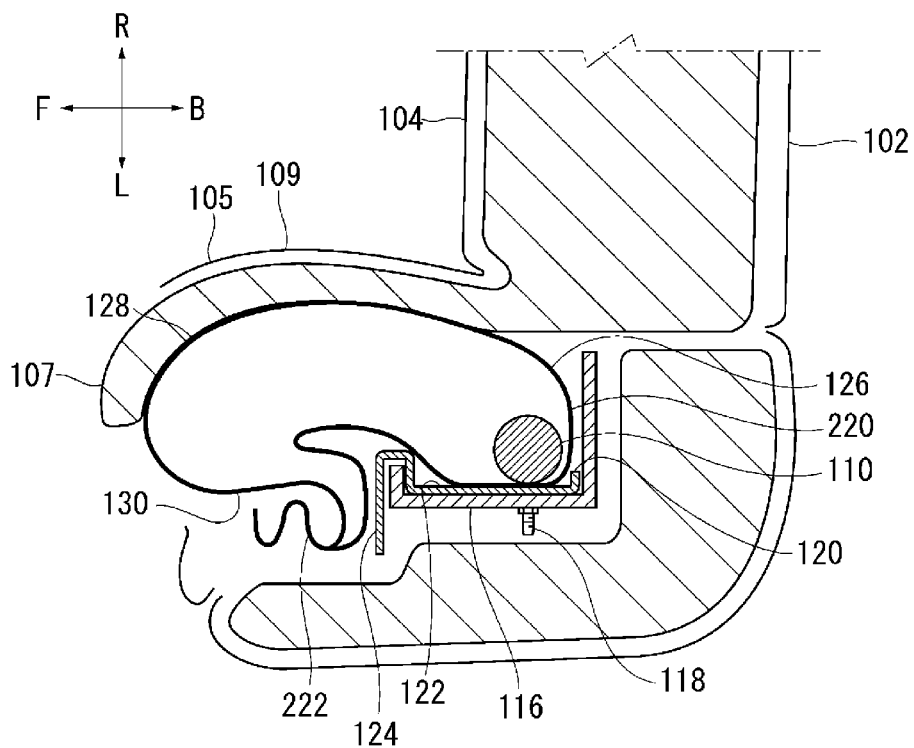

FIG. 9(b) is a state of the airbag cushion 220 continuing to expand and deploy from FIG. 9(a). After cleaving the surface skin 105 of the side support 109, the cushion extension part 128 expands toward the center of the seatback 104 and pushes the occupant back toward the center of the seatback 104.

As the cushion extension part 128 expands, gas is also supplied to the cushion folding part 130. Herein, because of the cushion folding part 130, unfolding of the airbag cushion 220 tends to be toward the center of the seatback 104.

Upon expansion of the cushion folding part 130, gas is also supplied to the cushion front part 222 folded in a bellows shape. The cushion front part 222 expands and deploys toward the front while unfolding. Herein, the cushion front part 222 contacts the rear wall part 124 of the rear bracket 120 and obtains a reaction force toward the front from the rear wall part 124. Thus, similar to the airbag cushion 120 [sic] in FIG. 5 the cushion front part 222 and therefore the entire airbag cushion 220 quickly and smoothly expands and deploys towards the front of the seat 102.

Airbag Module of Modified Example 1

Figure 10:
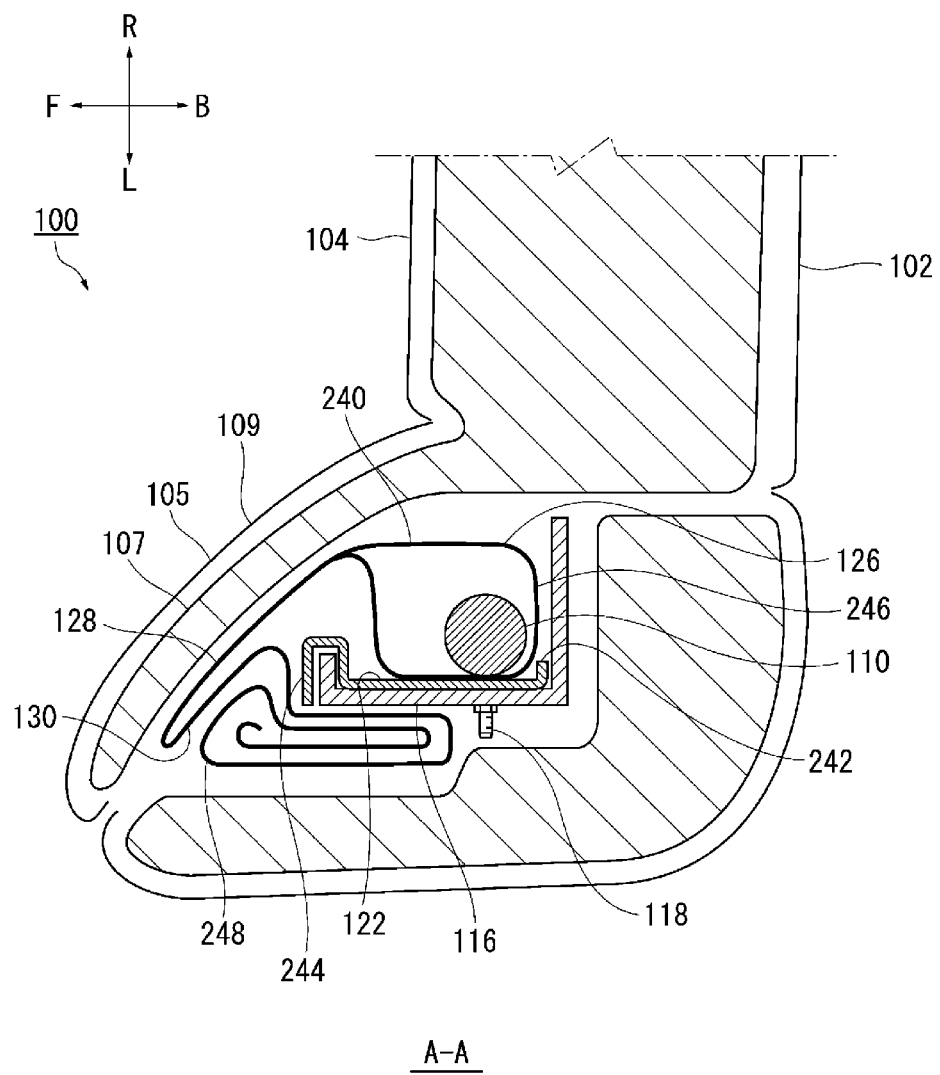
FIG. 10 is a diagram illustrating Modified Example 1 of the airbag module in FIG. 3.

FIG. 10 is a diagram illustrating Modified Example 1 of the airbag module 108 in FIG. 3 (airbag module 240). With the airbag module 240, a rear wall part 244 of a bracket 242 has a compact shape that does not protrude to the outside of the frame side plate part 116 in the width direction of the seatback 104. Furthermore, with an airbag cushion 246, a part of a cushion front part 248 is arranged to the outside of the frame side plate part 116.

With the airbag module 240, the airbag cushion 246 in a stowed state can be efficiently stowed inside the side support 109. Furthermore, similar to the airbag module 108 in FIG. 4 and FIG. 5, the airbag module 240 also uses a cushion extension part 128 or the like enabling pushing the occupant back close to a regular sitting position.

Airbag Module of Modified Example 2

Figure 11:
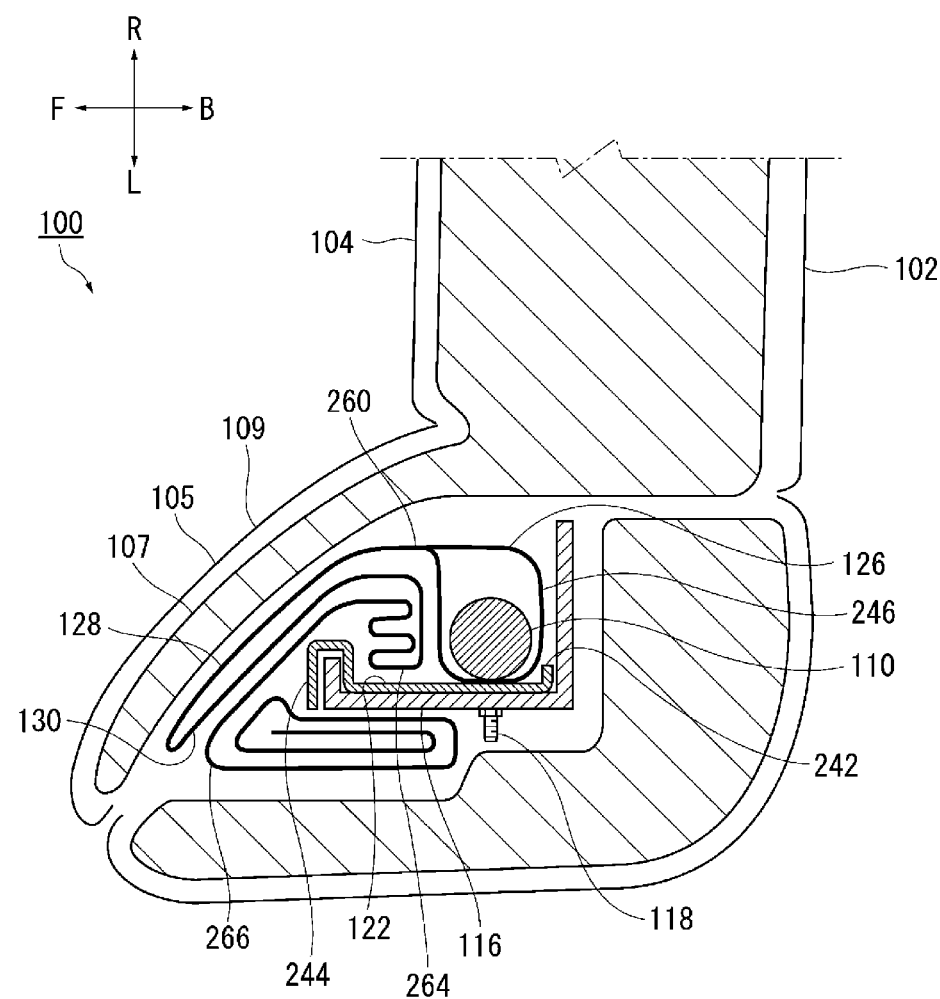
FIG. 11 is a diagram illustrating Modified Example 2 of the airbag module in FIG. 3.

FIG. 11 is a diagram illustrating a Modified Example 2 of the airbag module 108 in FIG. 3 (airbag module 260). With the airbag module 260, a cushion center part 264 is formed in an airbag cushion 262. The cushion center part 264 is formed between the cushion folding part 130 and a cushion front part 266 and is arranged in a bellows shape on the cushion rear part 126 at the center side of the frame side plate part 116.

With the airbag module 260 as well, a part of the cushion front part 266 is arranged to the outside of the frame side plate part 116. Furthermore, the airbag module 260 also enables efficient stowing of the airbag cushion 262 in a stowed state inside the side support 109.

In addition, similar to the airbag module 108 in FIG. 4 and FIG. 5, the airbag module 260 also uses a cushion extension part 128 or the like enabling pushing the occupant back close to a regular sitting position. Herein, with the airbag module 260, the cushion center part 264 being arranged at the center side of the frame side plate part 116 enables the cushion center part 264 to obtain a reaction force from the frame side plate part 116 toward the occupant upon expansion and deployment. Thus the airbag module 260 is more efficiently able to push the occupant back to a regular seating position by means of the cushion extension part 128 or the like.

Airbag Module of Modified Example 3

Figure 12:
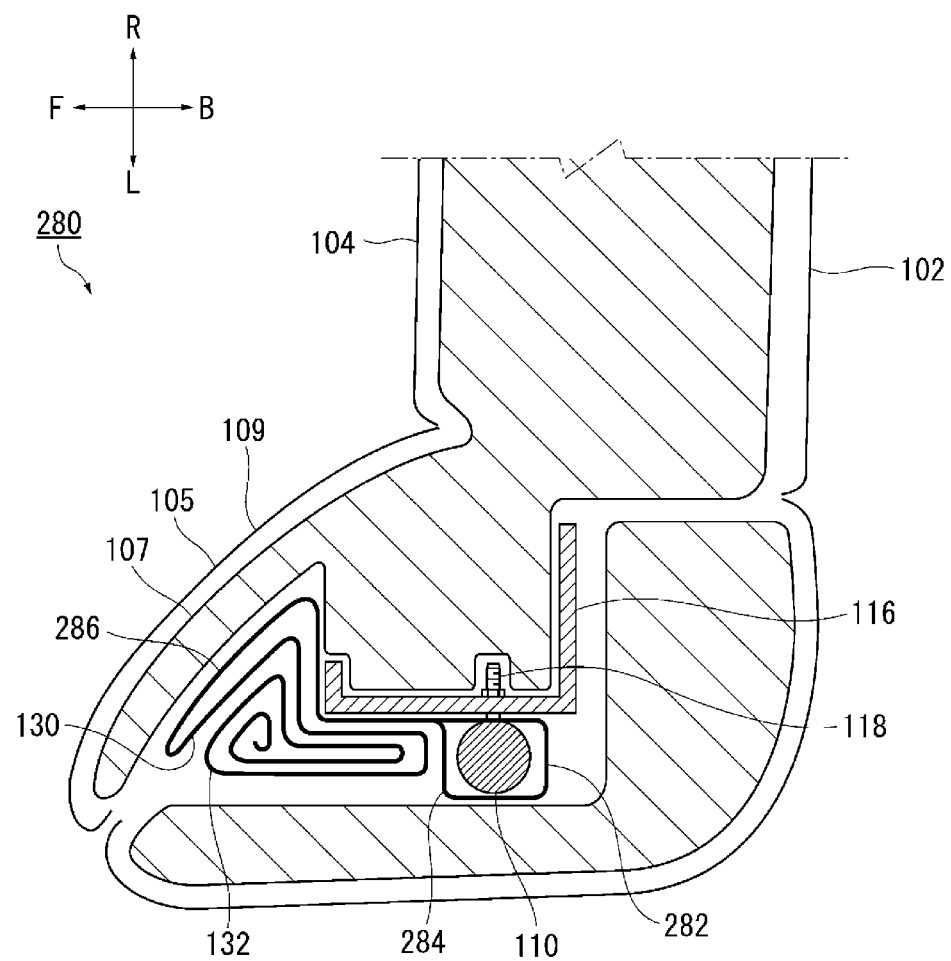
FIG. 12 is a diagram illustrating Modified Example 3 of the airbag module in FIG. 3.

FIG. 12 is a diagram illustrating a Modified Example 3 of the airbag module 108 in FIG. 3 (airbag module 280). The configuration of the airbag module 280 differs from the various Embodiments described above in that the inflator 110 is assembled together with an airbag cushion 282 on the frame side plate part 116, toward the outside in the width direction of the seatback 104.

For the airbag cushion 282, a cushion rear part 284 is assembled together with the inflator 110 on the frame side plate part 116, toward the outside in the width direction of the seatback 104.

A cushion extension part 286 extends from the cushion rear part 284 forward in contact with the frame side plate part 116 and bends along the front edge of the frame side plate part 116 toward the seat pad 107 of the side support 109 toward the center side of the seatback 104 in the width direction. Furthermore, the cushion extension part 286 extends forward while in contact with the seat pad 107 similar to various Embodiments described above.

Figure 13A:
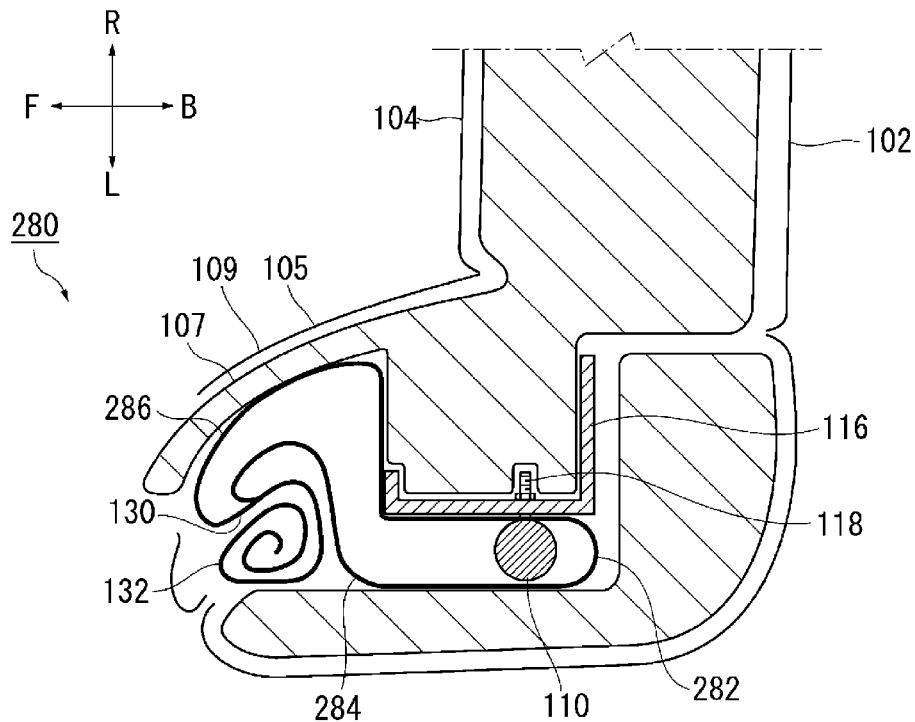
FIG. 13 is a diagram illustrating an example of the process of expansion and deployment of the airbag cushion of FIG. 12.

FIG. 13 is a diagram illustrating an example of the process of expansion and deployment of the airbag cushion 282 in FIG. 12. FIG. 13(a) illustrates an initial state of expansion and deployment of the airbag cushion 282 in FIG. 12. With the airbag cushion 282, after the inflator 110 activates and gas is supplied to the cushion rear part 284, the cushion extension part 286 expands and pushes and cleaves the seat pad 107 and surface skin 105 of the side support 109 from inside.

Figure 13B:
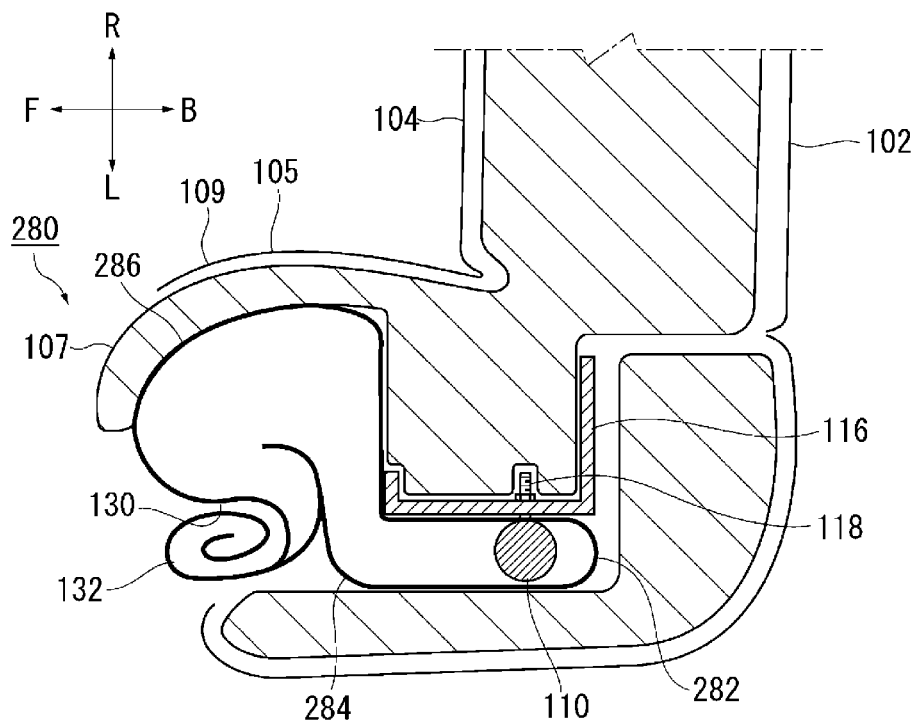

FIG. 13(b) is a state of the airbag cushion 282 continuing to expand and deploy from FIG. 13(a). After cleaving the surface skin 105 of the side support 109, the cushion extension part 286 expands toward the center of the seatback 104 and pushes the occupant back toward the center of the seatback 104.

Figure 14:
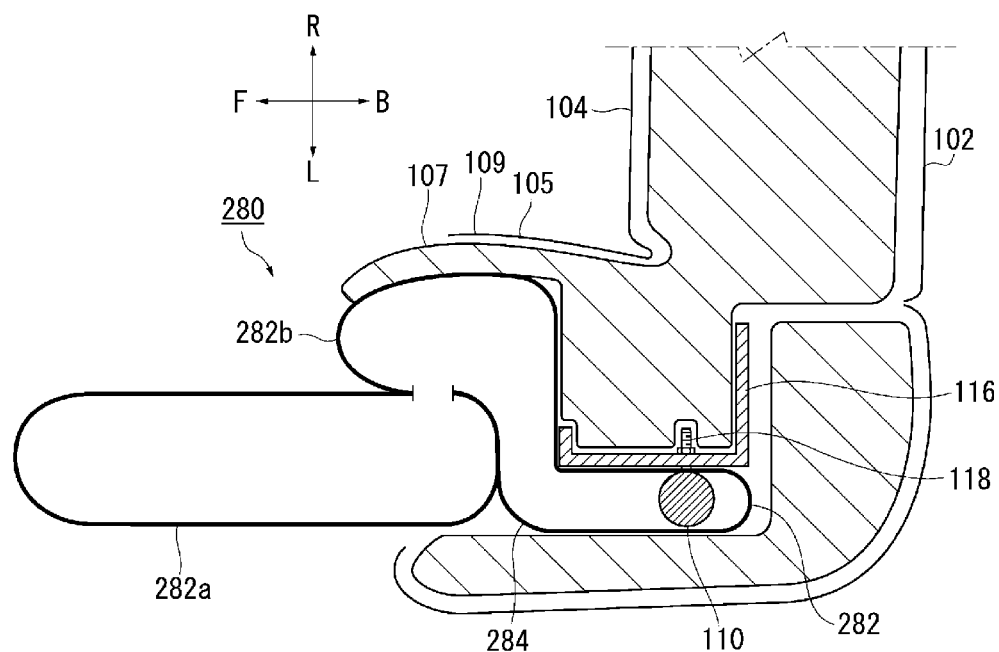
FIG. 14 is a state of the airbag cushion continuing to expand and deploy from FIG. 13(b).

FIG. 14 is a state of the airbag cushion 282 continuing to expand and deploy from FIG. 13(b). The airbag cushion 282 is also provided with a main chamber 282a and a pre-push chamber 282b. Therefore, similar to the airbag cushion 112 in FIG. 5, by means of the pre-push chamber 282b, the airbag cushion 282 pushes away the seat pad 107 inside the seat 102 to ensure space, to quickly expand and deploy, and to push the occupant back toward the center of the seat 102, enabling broad and sufficient restraint of the occupant by the main chamber 282a.

In this manner, the airbag module 280 also enables the airbag cushion 282 to smoothly expand and deploy from inside the side support 109 toward the side of an occupant seated in a seat and enables implementing a side airbag device that is able to improve the occupant restraint performance of the airbag cushion 282. In particular, in the first part of the expansion and deployment process, the cushion extension part 286 of the airbag cushion 282 presses on the seat pad 107 and surface skin 105 of the side support 109, enabling efficient cleaving of the surface skin 105 of the side support 109. In addition, the cushion extension part 286 expanding towards the center of the seatback 104 while pushing on the seat pad 107 enables pushing the occupant back toward the center of the seatback 104, in other words, close to the regular seating position.

As has been described, in any of the Embodiments described above, by forming a cushion extension part 128 in the various airbag cushions in a stowed state, cleaving the surface skin 105 of the seat 102 and pushing the occupant back into place can be efficiently performed, achieving improvement in occupant restraint performance.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in a side airbag device mounted on a vehicle.

DESCRIPTION OF CODES

100. Side airbag device, 102. Seat, 104. Seatback, 105. Surface skin, 106. Frame, 107. Seat pad, 108. Airbag module, 109. Side support, 110. Inflator, 111. Main body portion, 112. Airbag cushion, 112a. Main chamber, 112b. Pre-push chamber, 116. Frame side plate part, 118. Stud bolt, 120. Bracket, 122. Base part, 124. Rear wall part, 126. Cushion rear part, 128. Cushion extension part, 130. Cushion folding part, 132. Cushion front part, 200. Airbag cushion of Modified Example 1, 202. Rear folding part, 204. Cushion front part, 220. Airbag cushion of Modified Example 2, 222. Cushion front part, 240. Airbag module, 242. Bracket, 244. Rear wall part, 246. Airbag cushion, 248. Cushion front part, 260 Airbag module, 262. Airbag cushion, 264. Cushion center part, 266. Cushion front part, 280. Airbag module, 282. Airbag cushion, 282*a*. Main chamber, 282*b*. Pre-push chamber, 284. Cushion rear part, 286. Cushion extension part

The invention claimed is:

1. A side airbag device comprising:
a side support formed at an end part in a width direction of a seatback of a vehicle seat having a surface skin and a seat pad bent and protruding forward as compared to an area at a center of the seatback in the width direction;
a frame side plate portion provided along a seatback side surface inside the side support;
an airbag cushion that is a bag that is rolled or folded into a prescribed stowed state and embedded in the side support; and
an inflator inserted into the airbag cushion assembled in the frame side plate portion together with the airbag cushion; wherein
the airbag cushion in the stowed state includes:
a cushion rear part assembled to the frame side plate portion with the inflator contained therein;
a cushion extension part extending from the cushion rear part toward a front along the seat pad of the side support of the seatback in the width direction;
a cushion folding part folded from the cushion extension part towards a rear;
a cushion front part rolled or folded from the cushion folding part toward an outside of the cushion folding part in the width direction of the seatback; and
a cushion center part formed between the cushion folding part and the cushion front part and rolled or folded at a center side of the frame side plate portion,
wherein the cushion extension part receives gas from the cushion rear part, expands towards the center of the seatback, and together with the seat pad, are configured to push on an occupant.

2. The side airbag device according to claim 1, wherein the inflator is assembled together with the airbag cushion to the frame side plate portion at a center side of the seatback, and the cushion rear part is assembled to the center side of the frame side plate portion.

3. The side airbag device according to claim 1, wherein the airbag cushion includes:
a main chamber formed such that primarily the cushion front part expands and deploys in a prescribed shape; and
a pre-push chamber formed such that primarily the cushion extension part expands and deploys at a center of the main chamber.

4. The side airbag device according to claim 1, wherein the cushion folding part is formed from near a front end of the side support to near the frame side plate portion.

5. The side airbag device according to claim 1, wherein the cushion front part is in a clockwise rolled state as viewed from above.

6. The side airbag device according to claim 1, wherein the cushion front part is in a counterclockwise rolled state as viewed from above.

7. The side airbag device according to claim 1, wherein the cushion front part is folded in a bellows shape as viewed from above.

8. The side airbag device according to claim 1, wherein a part of the cushion front part is arranged outside the frame side plate portion in the width direction of the seatback.

9. The side airbag device according to claim 1, wherein the inflator is assembled together with the airbag cushion to an outside of the frame side plate portion in the width direction of the seatback, and the cushion rear part is assembled to the outside of the frame side plate portion in the width direction of the seatback.

10. The side airbag device according to claim 9, wherein the cushion extension part extends forward from the cushion rear part while in contact with the frame side plate portion, bends along a front edge of the frame side plate portion toward the seat pad of the side support in a center side of the seatback in the width direction, and extends forward while in contact with the seat pad.

11. The side airbag device according to claim 9, wherein the airbag cushion includes:
a main chamber formed such that primarily the cushion front part expands and deploys in a prescribed shape; and
a pre-push chamber formed such that primarily the cushion extension part expands and deploys at a center side of the main chamber.

12. The side airbag device according to claim 1, in combination with the vehicle seat.

13. A side airbag device comprising:
a side support formed at an end part in a width direction of a seatback of a vehicle seat having a surface skin and a seat pad bent and protruding forward as compared to an area at a center of the seatback in the width direction;
a frame side plate portion provided along a seatback side surface inside the side support;
an airbag cushion that is a bag that is rolled or folded into a stowed state and embedded in the side support;
an inflator inserted into the airbag cushion assembled in the frame side plate portion together with the airbag cushion; and
a bracket assembled to the frame side plate portion;
wherein the bracket includes:
a base part arranged between the frame side plate portion and a cushion rear part of the airbag cushion in the stowed state, the cushion rear part assembled to the frame side plate portion with the inflator contained therein; and
a rear wall part that extends and bends outwardly in the width direction of the seatback from a part of the base part more forward than the frame side plate portion, and
wherein the airbag cushion in the stowed state includes:
a cushion extension part extending from the cushion rear part toward a front along the seat pad of the side support of the seatback in the width direction;
a cushion folding part folded from the cushion extension part towards a rear;
a cushion center part rolled or folded at a center side of the frame side plate portion; and
a cushion front part rolled or folded from the cushion folding part toward an outside of the cushion folding part in the width direction of the seatback, the cushion center part formed between the cushion folding part and the cushion front part; and wherein the cushion extension part receives gas from the cushion rear part, expands towards the center of the seatback, and together with the seat pad, are configured to push on an occupant.

14. The side airbag device according to claim 13, wherein the rear wall part protrudes in the width direction of the seatback to an outside of the frame side plate portion, and the cushion front part of the airbag cushion in the stowed state is arranged on a front of the rear wall part of the bracket.

15. The side airbag device according to claim 13, in combination with the vehicle seat.

* * * * *